United States Patent
Zhang et al.

(10) Patent No.: US 10,299,130 B2
(45) Date of Patent: May 21, 2019

(54) RESOURCE SHARING METHOD AND RESOURCE SHARING SYSTEM

(71) Applicant: YULONG COMPUTER TELECOMMUNICATION SCIENTIFIC (SHENZHEN) CO., LTD., Shenzhen (CN)

(72) Inventors: Yun-Fei Zhang, Shenzhen (CN); Ting Fu, Shenzhen (CN); Yi-Qing Cao, Shenzhen (CN); Chen-Lu Zhang, Shenzhen (CN); Ya-Jun Zhu, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 166 days.

(21) Appl. No.: 15/328,559

(22) PCT Filed: Sep. 29, 2014

(86) PCT No.: PCT/CN2014/087833
§ 371 (c)(1),
(2) Date: Jan. 24, 2017

(87) PCT Pub. No.: WO2016/023262
PCT Pub. Date: Feb. 18, 2016

(65) Prior Publication Data
US 2017/0223542 A1    Aug. 3, 2017

(30) Foreign Application Priority Data

Aug. 15, 2014 (CN) .......................... 2014 1 0405103

(51) Int. Cl.
*H04L 29/06* (2006.01)
*H04W 12/08* (2009.01)
(Continued)

(52) U.S. Cl.
CPC ............. *H04W 12/08* (2013.01); *H04L 63/08* (2013.01); *H04L 63/10* (2013.01); *H04W 12/00* (2013.01); *H04W 12/06* (2013.01)

(58) Field of Classification Search
CPC ..... H04W 36/14; H04W 12/08; H04W 76/11; H04W 36/0005; H04W 88/16;
(Continued)

(56) References Cited

U.S. PATENT DOCUMENTS

2003/0058827 A1\* 3/2003 Chow ................... H04L 12/66
370/338
2003/0074443 A1\* 4/2003 Melaku ............... H04L 12/5692
709/224

(Continued)

OTHER PUBLICATIONS

Bart Barton, "LTE and Beyond, LTE attach procedure", Jan. 28, 2012, www.lteandbeyond.com. (Year: 2012).\*
(Continued)

*Primary Examiner* — Shawnchoy Rahman
*Assistant Examiner* — Lin Chang
(74) *Attorney, Agent, or Firm* — ScienBiziP, P.C.

(57) ABSTRACT

Resource sharing method and device are provided. The method includes: sending an access request to a second communication network through a target backhaul link of the second communication network by a resource sharing device when the access request is received from a terminal from a first communication network; sending the access request to the first communication network by the second communication network, for authenticating the terminal; sending QoS level information of the terminal to the second communication network by the first communication network when the terminal is authenticated, and sending access rejected information to the second communication network when the terminal is unauthenticated; providing services for the terminal according to the subscription QoS level infor-
(Continued)

mation, or rejecting to provide services for the terminal according to the access rejected information. The present disclosure realizes sharing of backhaul resources of different communication networks and ensures the QoS of the resource sharing device.

10 Claims, 4 Drawing Sheets

(51) Int. Cl.
  *H04W 12/00* (2009.01)
  *H04W 12/06* (2009.01)
(58) Field of Classification Search
  CPC ..... H04W 40/02; H04W 84/045; H04W 8/04; H04W 8/26; H04W 12/06; H04W 36/0066; H04W 36/12; H04W 48/02; H04W 72/0433; H04W 36/0022; H04W 4/24
  See application file for complete search history.

(56) References Cited

U.S. PATENT DOCUMENTS

| | | | |
|---|---|---|---|
| 2008/0076419 A1* | 3/2008 | Khetawat | H04L 12/66 455/435.1 |
| 2009/0005041 A1* | 1/2009 | Steinberg | H04W 48/18 455/435.2 |
| 2010/0040024 A1* | 2/2010 | Wu | H04W 60/04 370/331 |
| 2011/0310851 A1* | 12/2011 | Klingenbrunn | H04L 47/2491 370/332 |
| 2012/0238247 A1* | 9/2012 | Wen | H04W 12/08 455/411 |
| 2013/0097418 A1* | 4/2013 | Bhatt | H04L 63/0892 713/151 |
| 2013/0208696 A1* | 8/2013 | Garcia Martin | H04W 36/32 370/331 |
| 2014/0160939 A1* | 6/2014 | Arad | H04L 47/122 370/237 |
| 2014/0328311 A1* | 11/2014 | Qiang | H04W 72/087 370/329 |
| 2015/0312157 A1* | 10/2015 | Liu | H04W 76/15 370/329 |

OTHER PUBLICATIONS

Bart Barton, "LTE and Beyond, LTE attach procedure", Jan. 28, 2012, www.lteandbeyond.com. (Year: 2012) (Year: 2012).*

Tsunehiko et al. "Efficient Route Optimization Methods for Femtocell-based all IP networks", Oct. 1, 2009, 2009 IEEE International Conference on Wireless and Mobile Computing, Networking and Communications, pp. 221-226 (Year: 2009).*

Namal et al. "Securing the backhaul for mobile and multi-homed fenntocells", Jun. 1, 2011, 2011 Future Network & Mobile Summit (pp. 1-15) (Year: 2011).*

* cited by examiner

RESOURCE SHARING METHOD AND RESOURCE SHARING SYSTEM

FIELD

The present disclosure relates to the technical field of terminals, and in particular, to a resource sharing method and a resource sharing system.

BACKGROUND

Small cell technology refers to deploying a large number of low-power small cell nodes based on wide coverage macro base station network, according to service requirements and geographical environment, to improve coverage and the capacity of the network and meet requirements of users in the mobile Internet era. In future ultra-dense network deployments, there may be up to hundreds of small cells in a macro base station cell.

Existing small cells, such as a home base station (femto), use a wired backhaul link, such as an Asymmetric Digital Subscriber Line (ADSL)/Ethernet, to return information of the femto to a femto gateway. The wired backhaul link, such as the ADSL/Ethernet, can be a backhaul link of a femto home operator. That is, the femto uses the backhaul link of the home operator network and returns the information of the femto to the femto gateway of the home operator network. The wired backhaul link, such as the ADSL/Ethernet, can also be the backhaul link of a third-party operator. That is, the femto uses a backhaul link of the third-party operator network, and transmits the information of the femto to the femto gateway of the home operator network, using a public IP network of the third-party operator and transmission interfaces of the third-party operator and the home operator network.

For a small cell using the wired backhaul link, such as ADSL/Ethernet, if the wired backhaul link is the backhaul link of the home operator, a quality of service (QoS) of the small cell can be better ensured. Due to the small cell gateway being mainly in the home operator network, and information of the small cell can arrive at the small cell gateway directly, it does not need to be transmitted for long distance span gateways of different operators. If the backhaul link of the small cell is the backhaul link of the third-party operator, the QoS of the small cell cannot be reliably ensured. Before arriving at the small cell gateway, the information of the small cell needs to be transmitted in a long distance to reach a network interface between the third-party operator network and the home operator network. After arriving at the home operator network through the network interface, it is finally transmitted to the small cell gateway through the home operator network. In general, the network interfaces of different operator networks are transmission bottlenecks, and routing of the information transmission is long. Thus, ensuring the QoS of the small cell is difficult.

For historical reasons, the wired backhaul network resources of certain operators are relatively few, but user quantity is large. For example, there are three operators in China. Scale of backbone network capacity of China Mobile is 1/10 compared with the China Telecommunication/Communication. However, the number of users of the China Mobile is 4 times/2.5 times compared with the China Telecommunication/Communication respectively. In future ultra-dense network deployment, there may be up to hundreds of small cells in a macro base station cell, and the amount of traffic required by a single user is expected to be greatly increased. For the backbone networks of the China Mobile, the large-scale network backhaul is difficult to support. Cost of building a backhaul network is high, thus sharing a backhaul network of a third-party operator becomes a very feasible solution.

There is a need for a new technical solution, which can share the backhaul resources of a plurality of different communication networks. The resource utilization rate needs to be improved, and the QoS of the resource sharing device ought to be ensured.

SUMMARY OF THE INVENTION

Based on the above problems, the present disclosure provides a novel technical scheme, which can establish a backhaul mode that can share backhaul network resources of a third-party operator and also ensure a quality of service (QoS) of a small cell. In addition, the return mode can ensure the QoS of a resource sharing device.

In view of the above, the present disclosure provides a resource sharing method. The resource sharing method includes the following stages. When a resource sharing device receives an access request sent by a terminal from a first communication network, the resource sharing device sends the access request to a second communication network through a target backhaul link of the second communication network. The second communication network sends the received access request to the first communication network, for the first communication network authenticating the terminal according to the access request. The first communication network sends subscription QoS level information corresponding to the terminal to the second communication network when the terminals is authenticated, and the first communication network sends access rejected information to the second communication network when the terminal is unauthenticated. The second communication network provides services for the terminal according to the subscription QoS level information, or the second communication network rejects to provide any service for the terminal according to the access rejected information.

In the above disclosure, a resource sharing device is provided. The resource sharing device receives the access request from the terminal in the first communication network (e.g., a first operator), and then sends the access request to the second communication network (that is, a second operator). The second communication network processes the access request according to authentication information of the first communication network. That is, when the authentication is granted, access is allowed to the terminal. When the authentication is not granted, access is not allowed to the terminal. Thus, QoS of the resource sharing device is ensured. Moreover, the present disclosure realizes the sharing of backhaul resources of a plurality of different communication networks by using the resource sharing device, overcomes the huge costs of consuming the backhaul network, balances the load between the networks, and improves the resource utilization rate.

The above disclosure, preferably, further includes: analyzing the access request when received by the resource sharing device, to obtain home operator information and terminal identification (ID) according to the access request, and sending the home operator information, the terminal ID and the access request to the second communication network.

In the above disclosure, when receiving the access request, the resource sharing device obtains the home operator information and the terminal ID of the terminal by analyzing the access request, and forwards the home operator information, the terminal ID and the access request to the second communication network.

The above disclosure, preferably, further includes: the resource sharing device encrypting the home operator information, the terminal ID and the access request according to an encryption mode of a preset IP security channel, to obtain an encrypted data packet, and sending the encrypted data packet to the second communication network; the second communication network receiving the encrypted data packet, and decrypting the encrypted data packet according to a decryption mode corresponding to the encryption mode of the preset IP security channel, to obtain the home operator information, the terminal ID and the access request.

In the above disclosure, to ensure security of the access request in the transmission process, the home operator information, the terminal ID, and the access request are encrypted into an IP data packet by using an IP security channel protocol. In the IP data packet, an outer IP address is an IP address of a small cell gateway of the second communication network, and an inner address is a target terminal address. The encryption mode of the secure channel protocol used by the resource sharing device is agreed upon by the resource sharing device and the second communication network. When transmitting the IP data packet from the resource sharing device to the small cell gateway, the small cell gateway decrypts the IP data packet using a corresponding IP security channel protocol, to obtain the information sent to the small cell gateway by the resource sharing device.

In the above disclosure, preferably, the resource sharing device sends the encrypted data packet to the second communication network by using a differentiated service protocol or a resource reservation protocol (RSVP).

In the above disclosure, since the small cell service of the resource sharing device and common Wi-Fi/ADSL/Ethernet can contend for IP network transmission resource, to ensure the QoS of the small cell service, the resource sharing device can adopt the differentiated service (Diffserv) protocol when transmitting the IP security channel protocol packet of the small cell service. If the router network supports the RSVP, the RSVP with an improved performance can also be adopted.

The above disclosure, preferably, further includes: the resource sharing device selecting the target backhaul link from a plurality of backhaul links corresponding to the second communication network according to a preset selection principle. The preset selection principle includes whether an operator of the second communication network signed an agreement with the first communication network, and whether enough idle transmission resources exist in the backhaul link.

In the above disclosure, the resource sharing device may apply a variety of principles to select the backhaul link. For example, the resource sharing device may simultaneously access Wi-Fi of other communication networks in addition to the first communication network and the second communication network, and also can access the second communication network through ADSL. The resource sharing device needs to select one of the plurality of backhaul links as a selected backhaul mode. The principles of selecting the backhaul link include: whether the operator of the backhaul network signed an agreement with the network operator of the resource sharing device, whether enough idle transmission resources exist in the backhaul link or the like.

The above disclosure, preferably, further includes: the second communication network calculating costs of the terminal according to the home operator information and the terminal ID when providing services for the terminal.

In the above disclosure, when the second communication network provides services for the terminal, the costs of the terminal are calculated according to the home operator information and the terminal ID, to facilitate commercial settlement between operators.

The above disclosure, preferably, further includes: the second communication network storing the home operator information, the terminal ID and the subscription QoS level information corresponding to the terminal and determining whether to provide services for the terminal when the access request of the terminal is received again, according to the stored home operator information, the terminal ID, and the subscription QoS level information.

In the above disclosure, the second communication network may store the home operator information and the subscription QoS level information of terminals from other communication networks that often access the second communication network through the resource sharing device, to avoid information interaction between the first communication network and the second communication network when accessed by other operator terminals through the resource sharing device.

The above disclosure, preferably, further includes: the second communication network updating the stored home operator information, the terminal ID and the subscription QoS level information corresponding to the terminal according to a preset time interval.

In the above disclosure, the second communication network may periodically update the stored home operator information, the terminal ID, and the subscription QoS level information, to ensure that the information is always correct.

According to another aspect, the present disclosure further provides a resource sharing system. The resource sharing system includes: a resource sharing device, a first communication network and a second communication network. The resource sharing device receives an access request sent by a terminal from the first communication network, and sends the access request to the second communication network through a target backhaul link of the second communication network. The second communication network sends the received access request to the first communication network for the first communication network to authenticate the terminal according to the access request. The first communication network sends subscription QoS level information corresponding to the terminal to the second communication network when the terminals is authenticated, and sends access rejected information to the second communication network when the terminal is unauthenticated. The second communication network further provides services for the terminal according to the subscription QoS level information, or rejects to provide any service for the terminal according to the access rejected information.

In the above disclosure, the resource sharing device is provided. The resource sharing device receives the access request from the terminal in the first communication network (e.g., a first operator), and then sends the access request to the second communication network (that is, a second operator). The second communication network processes the access request according to authentication information of the first communication network. That is, when the authentication is granted, access is allowed to the terminal. When the authentication is not granted, access is not allowed to the terminal. Thus, sharing backhaul resources of a plurality of different communication networks can be realized by using the resource sharing device, the huge costs of consuming the backhaul network is overcame, the load between the networks is balanced, and the resource utilization rate is improved. Moreover, the second communication network provides services for the terminal according to the subscription QoS level information, thus, QoS of the resource sharing device can be ensured.

In the above disclosure, preferably, the resource sharing device is further configured to analyze the access request when receiving the access request, to obtain home operator information and terminal ID of the terminal according to the access request, and to send the home operator information, the terminal ID, and the access request to the second communication network.

In the above disclosure, when receiving the access request, the resource sharing device obtains the home operator information and the terminal ID of the terminal by analyzing the access request, and forwards the home operator information, the terminal ID, and the access request to the second communication network.

In the above disclosure, preferably, the resource sharing device is further configured to encrypt the home operator information, the terminal ID and the access request according to an encryption mode of a preset IP security channel, to obtain an encrypted data packet, and to send the encrypted data packet to the second communication network. The second communication network is further configured to receive the encrypted data packet, and decrypt the encrypted data packet according to a decryption mode corresponding to the encryption mode of the preset IP security channel, to obtain the home operator information, the terminal ID and the access request.

In the above disclosure, to ensure security of the access request in the transmission process, the home operator information, the terminal ID, and the access request are encrypted into an IP data packet by using an IP security channel protocol. In the IP data packet, an outer IP address is an IP address of a small cell gateway of the second communication network, and an inner address is a target terminal address. The encryption mode of the secure channel protocol used by the resource sharing device is agreed by the resource sharing device and the second communication network. When transmitting the IP data packet from the resource sharing device to the small cell gateway, the small cell gateway decrypts the IP data packet using a corresponding IP security channel protocol, to obtain the information sent to the small cell gateway by the resource sharing device.

In the above disclosure, preferably, the resource sharing device sends the encrypted data packet to the second communication network by using a differentiated service protocol or a resource reservation protocol (RSVP).

In the above disclosure, since the small cell service of the resource sharing device and common Wi-Fi/ADSL/Ethernet can contend for IP network transmission resource, to ensure the QoS of the small cell service, the resource sharing device can adopt the differentiated service protocol when transmitting the IP security channel protocol packet of the small cell service. If the router network supports the RSVP, the RSVP with an improved performance can also be adopted.

In the above disclosure, preferably, the resource sharing device is further configured to select the target backhaul link from a plurality of backhaul links corresponding to the second communication network according to a preset selection principle. The preset selection principle includes whether an operator of the second communication network signed an agreement with the first communication network, and whether enough idle transmission resources exist in the backhaul link.

In the above disclosure, the resource sharing device may apply a variety of principles to select the backhaul link. For example, the resource sharing device may simultaneously access Wi-Fi of other communication networks in addition to the first communication network and the second communication network, and also can access the second communication network through ADSL. The resource sharing device needs to select one of the plurality of backhaul links as a selected backhaul mode. The principles of selecting the backhaul link include: whether the operator of the backhaul network signed an agreement with the network operator of the resource sharing device, whether enough idle transmission resources exist in the backhaul link or the like.

In the above disclosure, preferably, the second communication network is further configured to calculate costs of the terminal according to the home operator information and the terminal ID when providing services for the terminal.

In the above disclosure, when the second communication network provides services for the terminal, the costs of the terminal are calculated according to the home operator information and the terminal ID, to facilitate commercial settlement between operators.

In the above disclosure, preferably, the second communication network is further configured to store the home operator information, the terminal ID and the subscription QoS level information corresponding to the terminal, and determine whether to provide services for the terminal when the access request of the terminal is received again, according to the stored home operator information, the terminal ID and the subscription QoS level information.

In the above disclosure, the second communication network may store the home operator information and the subscription QoS level information of terminals from other communication networks that often access the second communication network through the resource sharing device, to avoid information interaction between the first communication network and the second communication network when accessed by other operator terminals through the resource sharing device.

In the above disclosure, preferably, the second communication network is further configured to update the stored home operator information, the terminal ID and the subscription QoS level information corresponding to the terminal according to a preset time interval.

In the above disclosure, the second communication network may periodically update the stored home operator information, the terminal ID and the subscription QoS level information, to ensure that the information is always correct.

In the above disclosure, preferably, the resource sharing device is connected to the second communication network by a wired connection or a wireless connection.

Through accessing the communication networks by the resource sharing device through a wired connection or a Wi-Fi connection, the present disclosures provided above realizes sharing backhaul resources of a plurality of different communication networks, overcomes the huge costs of consuming the backhaul network, balances the load between the networks, improves the resource utilization rate, and meanwhile, ensures QoS of the resource sharing device.

DETAILED DESCRIPTION

To better understand the above objectives, features, and advantages of the present disclosure, the following will be further described in detail with reference to the accompanying drawings and the detailed description. It should be noted that, the exemplary embodiments of the application and the features in the exemplary embodiments can be combined with each other when no conflict exists.

In the following description, numerous specific details are set forth to provide a thorough understanding of the present disclosure. However, the present disclosure may also be implemented in other ways other than those described herein. Accordingly, the scope of the present disclosure is not limited by the specific exemplary embodiments disclosed below.

Figure 1:
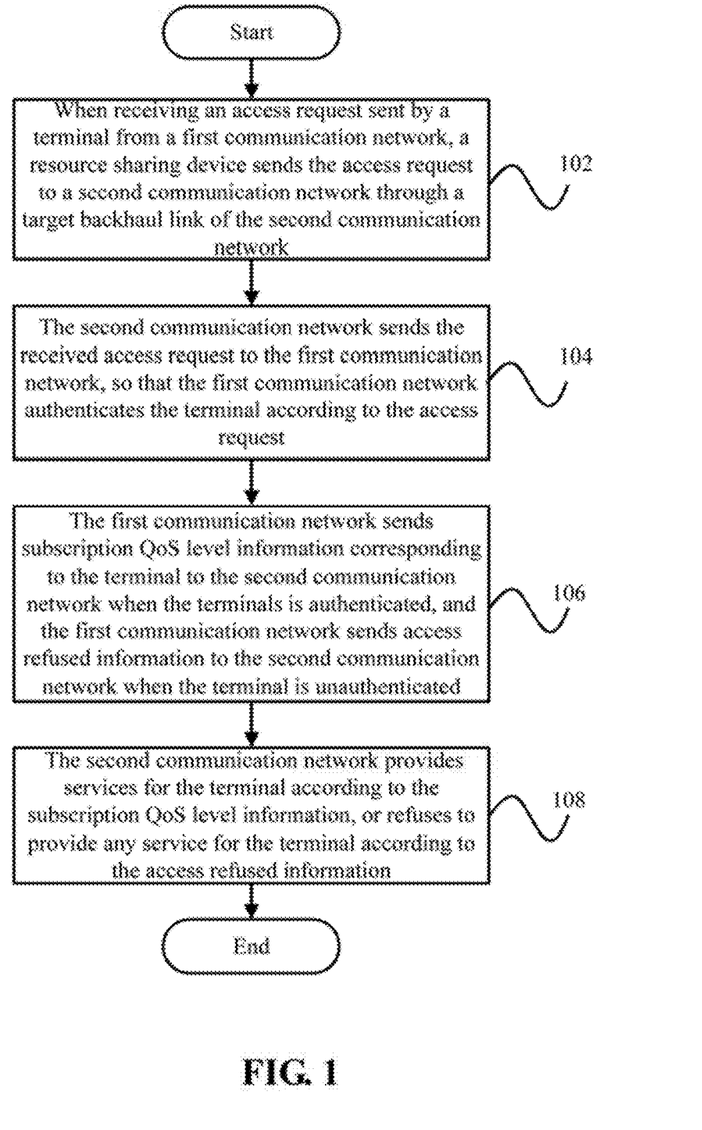
FIG. 1 illustrates a flowchart of a resource sharing method according to an exemplary embodiment of the present disclosure.

FIG. 1 illustrates a flowchart of a resource sharing method according to one exemplary embodiment of the present disclosure.

As shown in FIG. 1, a resource sharing method according to one exemplary embodiment of the present disclosure includes the following stages. Step 102, when a resource sharing device receives an access request sent by a terminal from a first communication network, the resource sharing device sends the access request to a second communication network through a target backhaul link of the second communication network. Step 104, the second communication network sends the received access request to the first communication network for the first communication network to authenticate the terminal according to the access request Step 106, the first communication network sends subscription quality of service (QoS) level information corresponding to the terminal to the second communication network when the terminals is authenticated, and the first communication network sends access rejected information to the second communication network when the terminal is unauthenticated. Step 108, the second communication network provides services for the terminal according to the subscription QoS level information, or rejects to provide any service for the terminal according to the access rejected information.

In the above disclosure, a resource sharing device is provided. The resource sharing device receives the access request from the terminal in the first communication network (e.g., a first operator), and then sends the access request to the second communication network (e.g., a second operator). The second communication network processes the access request according to authentication information of the first communication network. That is, when the authentication is granted, access is allowed to the terminal, and when the authentication is not granted, access is not allowed to the terminal. Thus, QoS of the resource sharing device is ensured. Moreover, the present disclosure realizes sharing backhaul resources of a plurality of different communication networks by using the resource sharing device, overcomes the huge costs of consuming the backhaul network, balances the load between the networks, and improves the resource utilization rate. Moreover, the second communication network provides services for the terminal according to the subscription QoS level information of the terminal.

The above disclosure, preferably, further includes: analyzing the access request when the resource sharing device receives the access request, to obtain home operator information and terminal identification (ID) according to the access request, and sending the home operator information, the terminal ID and the access request to the second communication network.

In the above disclosure, when receiving the access request, the resource sharing device obtains the home operator information and the terminal ID of the terminal by analyzing the access request, and forwards the home operator information, the terminal ID and the access request to the second communication network.

The above disclosure, preferably, further includes: the resource sharing device encrypting the home operator information, the terminal ID and the access request according to an encryption mode of a preset Internet Protocol (IP) security channel, to obtain an encrypted data packet, and sending the encrypted data packet to the second communication network; the second communication network receiving the encrypted data packet, and decrypting the encrypted data packet according to a decryption mode corresponding to the encryption mode of the preset IP security channel, to obtain the home operator information, the terminal ID and the access request.

In the above disclosure, to ensure security of the access request in the transmission process, the home operator information, the terminal ID, and the access request are encrypted into an IP data packet by using an IP security channel protocol. In the IP data packet, an outer IP address is an IP address of a small cell gateway of the second communication network, and an inner address is a target terminal address. The encryption mode of the secure channel protocol used by the resource sharing device is agreed by the resource sharing device and the second communication network. When transmitting the IP data packet from the resource sharing device to the small cell gateway, the small cell gateway decrypts the IP data packet using a corresponding IP security channel protocol, to obtain the information sent to the small cell gateway by the resource sharing device.

In the above disclosure, preferably, the resource sharing device sends the encrypted data packet to the second communication network by using a differentiated service protocol or a resource reservation protocol (RSVP).

In the above disclosure, since the small cell service of the resource sharing device and common Wi-Fi/ADSL/Ethernet can contend for IP network transmission resource, to ensure the QoS of the small cell service, the resource sharing device can adopt the differentiated service protocol when transmitting the IP security channel protocol packet of the small cell service. If the router network supports the RSVP, the RSVP with an improved performance can also be adopted.

The above disclosure, preferably, further includes: the resource sharing device selecting the target backhaul link from a plurality of backhaul links corresponding to the second communication network according to a preset selection principle. The preset selection principle includes whether an operator of the second communication network signed an agreement with the first communication network, and whether enough idle transmission resources are existed in the backhaul link.

In the above disclosure, the resource sharing device may apply a variety of principles to select the backhaul link. For example, the resource sharing device may simultaneously access Wi-Fi of other communication networks in addition to the first communication network and the second communication network, and also can access the second communication network through ADSL. The resource sharing device needs to select one of the plurality of backhaul links as a selected backhaul mode. The principles of selecting the backhaul link include: whether the operator of the backhaul network signed an agreement with the network operator of the resource sharing device, whether enough idle transmission resources are existed in the backhaul link or the like.

The above disclosure, preferably, further includes: the second communication network calculating a cost of the terminal according to the home operator information and the terminal ID when providing services for the terminal.

In the above disclosure, when the second communication network provides services for the terminal, the cost of the terminal is calculated according to the home operator information and the terminal ID, to facilitate commercial settlement between operators.

The above disclosure, preferably, further includes: the second communication network storing the home operator information, the terminal ID and the subscription QoS level information corresponding to the terminal, and determining whether to provide services for the terminal when the access request is received again, according to the stored home operator information, the terminal ID and the subscription QoS level information.

In the above disclosure, the second communication network may store the home operator information and the subscription QoS level information of terminals of other communication networks that often access the second communication network through the resource sharing device, to avoid information interaction between the first communication network and the second communication network when accessed by other operator terminals through the resource sharing device.

The above disclosure, preferably, further includes: the second communication network updating the stored home operator information, the terminal ID and the subscription QoS level information corresponding to the terminal according to a preset time interval.

In the above disclosure, the second communication network may periodically update the stored home operator information, the terminal ID and the subscription QoS level information, to ensure that the information is always correct.

Figure 2:
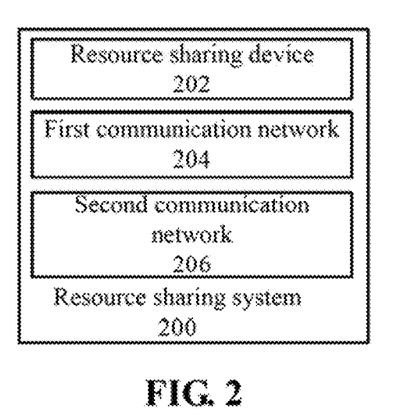
FIG. 2 illustrates a block diagram of a resource sharing system according to an exemplary embodiment of the present disclosure.

FIG. 2 illustrates a block diagram of a resource sharing system according to one exemplary embodiment of the present disclosure.

As shown in FIG. 2, a resource sharing system 200 according to one exemplary embodiment of the present disclosure includes: a resource sharing device 202, a first communication network 204, and a second communication network 206. The resource sharing device 202 includes at least one processor and a storage system. The storage system stores one or more programs which when executed by the at least one processor, causes the at least one processor to perform a resource sharing method. The resource sharing device 202 receives an access request sent by a terminal from the first communication network 204 and sends the access request to the second communication network 206 through a target backhaul link of the second communication network. The second communication network 206 sends the received access request to the first communication network 204, for the first communication network 204 can authenticating the terminal according to the access request. The first communication network 204 sends subscription QoS level information corresponding to the terminal to the second communication network 206 when the terminals is authenticated, and sends access rejected information to the second communication network 206 when the terminal is unauthenticated. The second communication network 206 further provides services for the terminal according to the subscription QoS level information, or rejects to provide any service for the terminal according to the access rejected information.

In the above disclosure, the resource sharing device is provided. The resource sharing device receives the access request from the terminal in the first communication network (e.g., a first operator), and then sends the access request to the second communication network (that is, a second operator). The second communication network processes the access request according to authentication information of the first communication network. That is, when the authentication is granted, access is allowed to the terminal. When the authentication is not granted, access is not allowed to the terminal. Thus, sharing backhaul resources of a plurality of different communication networks is realized by using the resource sharing device, the huge costs of consuming the backhaul network is overcame, the load between the networks is balanced, and the resource utilization rate is improved. Moreover, the second communication network provides services for the terminal according to the subscription QoS level information, thus, QoS of the resource sharing device can be ensured.

In the above disclosure, preferably, the resource sharing device 202 further analyzes the access request when receiving the access request, to obtain home operator information and terminal ID of the terminal according to the access request, and to send the home operator information, the terminal ID, and the access request to the second communication network.

In the above disclosure, when receiving the access request, the resource sharing device obtains the home operator information and the terminal ID of the terminal by analyzing the access request, and forwards the home operator information, the terminal ID and the access request to the second communication network.

In the above disclosure, preferably, the resource sharing device 202 further encrypts the home operator information, the terminal ID and the access request according to an encryption mode of a preset IP security channel, to obtain an encrypted data packet, and to send the encrypted data packet to the second communication network. The second communication network 206 further receives the encrypted data packet, and to decrypt the encrypted data packet according to a decryption mode corresponding to the encryption mode of the preset IP security channel, and to obtain the home operator information, the terminal ID and the access request.

In the above disclosure, to ensure security of the access request in the transmission process, the home operator information, the terminal ID, and the access request are encrypted into an IP data packet by using an IP security channel protocol. In the IP data packet, an outer IP address is an IP address of a small cell gateway of the second communication network, and an inner address is a target terminal address. The encryption mode of the secure channel protocol used by the resource sharing device is agreed by the resource sharing device and the second communication network. When transmitting the IP data packet from the resource sharing device to the small cell gateway, the small cell gateway decrypts the IP data packet using a corresponding IP security channel protocol, to obtain the information sent to the small cell gateway by the resource sharing device.

In the above disclosure, preferably, the resource sharing device sends the encrypted data packet to the second communication network by using a differentiated service protocol or a resource reservation protocol (RSVP).

In the above disclosure, since the small cell service of the resource sharing device and common Wi-Fi/ADSL/Ethernet can contend for IP network transmission resource, to ensure the QoS of the small cell service, the resource sharing device can adopt the differentiated service protocol when transmitting the IP security channel protocol packet of the small cell service. If the router network supports the RSVP, the RSVP with an improved performance can also be adopted.

In the above disclosure, preferably, the resource sharing device 202 further selects the target backhaul link from a plurality of backhaul links corresponding to the second communication network 206 according to a preset selection principle. The preset selection principle includes whether an operator of the second communication network 206 signed an agreement with the first communication network 204, and whether enough idle transmission resources exist in the backhaul link.

In the above disclosure, the resource sharing device may apply a variety of principles to select the backhaul link. For example, the resource sharing device may simultaneously access Wi-Fi of other communication networks in addition to the first communication network and the second communication network, and also can access the second communication network through ADSL. The resource sharing device needs to select one of the plurality of backhaul links as a selected backhaul mode. The principles of selecting the backhaul link include: whether the operator of the backhaul network signed an agreement with the network operator of the resource sharing device, whether enough idle transmission resources exist in the backhaul link or the like.

In the above disclosure, preferably, the second communication network 206 further calculates a cost of the terminal according to the home operator information and the terminal ID when providing services for the terminal.

In the above disclosure, when the second communication network provides services for the terminal, the cost of the terminal is calculated according to the home operator information and the terminal ID, to facilitate commercial settlement between operators.

In the above disclosure, preferably, the second communication network 206 further stores the home operator information, the terminal ID and the subscription QoS level information corresponding to the terminal, and determine whether to provide services for the terminal when the access request of the terminal is received again, according to the stored home operator information, the terminal ID and the subscription QoS level information.

In the above disclosure, the second communication network may store the home operator information and the subscription QoS level information of terminals from other communication networks that often access the second communication network through the resource sharing device, to avoid information interaction between the first communication network and the second communication network when accessed by other operator terminals through the resource sharing device.

In the above disclosure, preferably, the second communication network 206 further updates the stored home operator information, the terminal ID and the subscription QoS level information corresponding to the terminal according to a preset time interval.

In the above disclosure, the second communication network may periodically update the stored home operator information, the terminal ID and the subscription QoS level information, to ensure that the information is always correct.

In the above disclosure, preferably, the resource sharing device is connected to the second communication network by a wired connection or a wireless connection.

Figure 3:
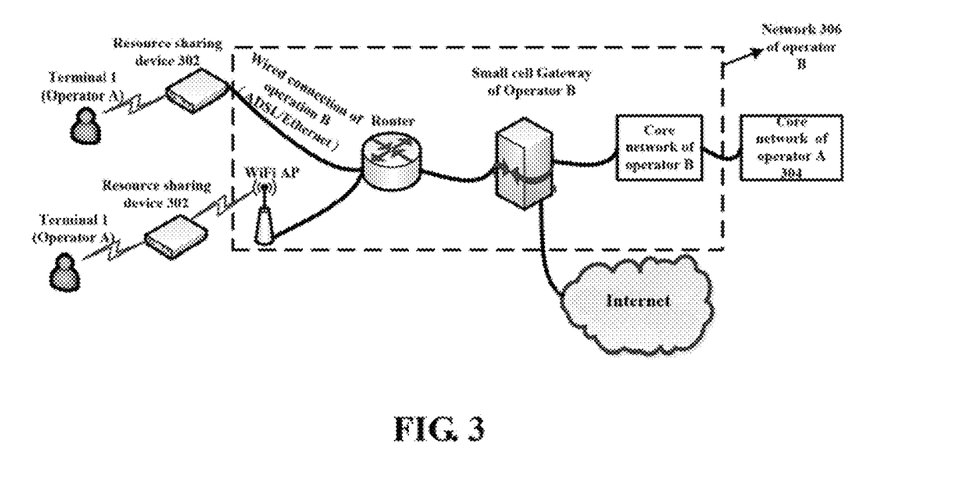
FIG. 3 is a diagram of structure of a resource sharing system according to an exemplary embodiment of the present disclosure.

FIG. 3 is a structure diagram of a resource sharing system according to an exemplary embodiment of the present disclosure As shown in FIG. 3, a resource sharing system 300 according to one exemplary embodiment of the present disclosure includes: a resource sharing device 302, a network 304 of an operator A (e.g., the first communication network) and a network 306 of an operator B (e.g., the second communication network). When a terminal 1 of the operator A304 requests access to the resource sharing device 302, the resource sharing device 302 sends an access request and related information of the terminal 1 to a small cell gateway (micro cell service gateway) of the operator B306 through a backhaul link of the operator B306. The small cell gateway sends the access request and the related information of the terminal 1 to a core network of the operator B306. The core network of the operator B306 sends the access request and the related information of the terminal 1 to a core network of the operator A304. The core network of the operator A304 authenticates the terminal 1. If access is allowed, subscription QoS level information of the terminal 1 is indicated to the core network of the operator B306, and the access network information of the terminal 1 is registered, for operations such as paging being facilitated. If access is denied, access information is indicated to the core network of the operator B306. The core network of the operator B306 can reject access of the terminal 1, or can register the terminal 1 into the core network of the operator B306 according to notification information of the core network of the operator A304, and thus, provide services for the terminal 1 according to the subscription QoS level information of the terminal 1 notified by the network 304 of the operator A.

The technical solutions of the present disclosure are described in detail below in combination with FIG. 4.

Figure 4:
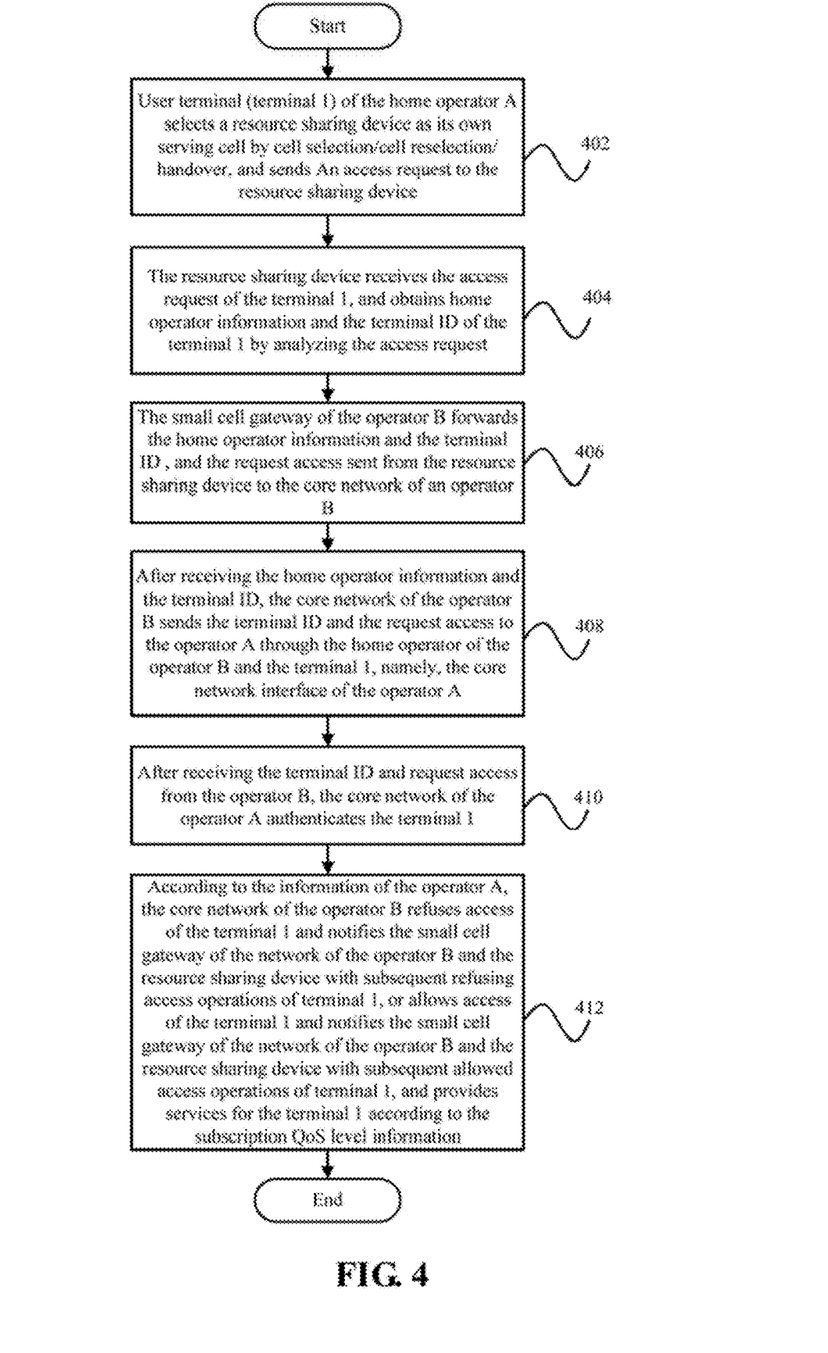
FIG. 4 illustrates a detailed flowchart of a resource sharing method according to an exemplary embodiment of the present disclosure.

As shown in FIG. 4, a detailed flow diagram of a resource sharing method according to an exemplary embodiment of the present disclosure includes:

Step 402, a user terminal (terminal 1) of the home operator A selects a resource sharing device as its own serving cell by a process, such as, cell selection/cell reselection/handover, and sends access request to the resource sharing device. The resource sharing device includes a terminal module (T-module) and a small cell base station module (SC-module). The SC-module supports network connections for users of the operator A, and the T-module may access the network of the operator B through a wired connection (ADSL/Ethernet, etc.)

Step 404, the resource sharing device receives the access request of the terminal 1, and obtains home operator information and the terminal ID of the terminal 1 by analyzing the access request. The resource sharing device sends the home operator information, the terminal ID, and the access request to a small cell gateway of the network of the operator B through the backhaul link of the operator B.

More specifically, the resource sharing device may apply a variety of principles to select the backhaul link. For example, the resource sharing device may simultaneously access Wi-Fi of an operator C, and also can access the operator B through ADSL. The resource sharing device needs to select one of the plurality of backhaul links as a selected backhaul mode. The principles of selecting the backhaul link include: whether the operator of the backhaul network signed an agreement with the network operator of the resource sharing device, whether enough idle transmission resources exist in the backhaul link or the like.

More specifically, if a public IP network, which may not be safe, is passed between the resource sharing device and the small cell gateway, the SC-module may encrypt the home operator information, the terminal ID of the terminal 1 and the request access information into an IP data packet by using an IPsec protocol. The outer IP address of the IP data packet is the IP address of the small cell gateway. The encryption mode of the IPsec protocol used by the SC-module should be agreed by the SC-module and the small cell gateway. When the IP data packet is transmitted from the resource sharing device to the small cell gateway, the IP data packet is decrypted by the small cell gateway using a corresponding IPsec protocol, to obtain the information sent to the small cell gateway by the resource sharing device.

More specifically, since the small cell service of the resource sharing device and common Wi-Fi/ADSL/Ethernet can contend for IP network transmission resource, to ensure the QoS of the small cell service, the resource sharing device can adopt the Diffserv protocol when transmitting the IP security channel protocol packet of the small cell service. If the router network supports the RSVP, the RSVP with an improved performance can also be adopted.

More specifically, if the backhaul link of the operator B is under heavy load, the router can enable flow management and control rules, to limit certain service flows (for example, the speed limit of the large-flow service of a monthly user) and to ensure the QoS of the small cell service.

Step 406, the small cell gateway of the operator B forwards the home operator information and the terminal ID of the terminal 1, and the access request sent from the resource sharing device to the core network of an operator B. Generally, the backhaul link from the small cell gateway to the core network is a network dedicated backhaul link, thus, information transmission can be performed using a transmission protocol agreed within the network.

Step 408, after receiving the home operator information and the terminal ID of the terminal 1, the core network of the operator B sends the terminal ID and the access request to the operator A through the home operator of the operator B and the terminal 1, namely, the core network interface of the operator A.

Step 410, after receiving the terminal ID and the access request from the operator B, the core network of the operator A authenticates the terminal 1. If the authentication is successful, the access of the terminal 1 is allowed. The operator A notifies subscription QoS level information to the core network of the operator B through the core network interface of the two operators. At the same time, current access network information of the terminal 1 is registered by the core network of the operator A, so as to facilitate subsequent operations such as paging users. If the authentication fails, the access of the terminal is rejected. The operator A notifies access rejected information to the operator B through the core network interface of the two operators.

Step 412, according to the information notified by the operator A, the core network of the operator B can reject access of the terminal 1 and notifies the small cell gateway of the network of the operator B and the resource sharing device with subsequent series of rejecting access operations of terminal 1, or allows access of the terminal 1 and notifies the small cell gateway of the network of the operator B and the resource sharing device with subsequent series of allowed access operations of terminal 1. After that, the core network of the operator B can provide communication services for the terminal 1 according to the subscription QoS level information of the terminal 1 notified by the operator A.

Additionally, the operator A can set a billing module in the small cell gateway, to calculate communication service costs of the terminal 1 through the network resources of the operator B, so as to facilitate commercial settlement between operators.

Additionally, the operator B may store the home operator information and the subscription QoS level information of terminals of other communication networks that often access the operator B through the resource sharing device, to avoid information interaction between core networks of the operators when accessed by other operator terminals through the resource sharing device (namely step 408 and step 410). Moreover, the operator B may periodically update the stored home operator information, and the subscription QoS level information, to ensure that the information is correct.

Additionally, the operator B can also sign an agreement with the operator A, to share the subscription QoS level information of users of the operator A, to avoid information interaction between core networks of the operators when accessed by other operator terminals through the resource sharing device (namely step 408 and step 410).

In the above process, a backhaul resource sharing protocol is required between the operator A and the operator B. The backhaul resource sharing protocol includes but not limited to:

(1) The resource sharing device needs to be in an agreement with the small cell gateway of the operator B as to using the IPsec protocol, to ensure the consistency of data encryption and decryption.

(2) The operator A and the operator B need to be in an agreement as to the billing mode.

(3) The operator A and the operator B need to be in an agreement as to an information format of the access request and the subscription QoS level information interacting in the core network interface.

The technical solution above of the present disclosure is described in detail with reference to the accompanying drawings. The technical solutions of the present disclosure realizes sharing backhaul resources of a plurality of different communication networks by using the resource sharing device, overcomes the huge costs of consuming the backhaul network, balances the load between the networks, and improves the resource utilization rate, and ensure the QoS of the resource sharing device.

The above descriptions are only preferred exemplary embodiments of the present disclosure, and are not to be used to limit the present disclosure. It will be apparent to those skilled in the art that various modifications and variations can be made in the present disclosure. Any modification or modification made without departing from the spirit and principle of the present disclosure are to be covered by the claims herein. Equivalent substitutions, improvements and the like are intended to be included within the scope of the present disclosure.

What is claimed is:

1. A computer-implemented resource sharing method, comprising:

sending an access request to a second communication network through a target backhaul link of the second communication network by a resource sharing device when the resource sharing device receives the access request sent by a terminal from a first communication network;

sending the received access request to the first communication network by the second communication network, for the first communication network to authenticate the terminal according to the access request;

sending subscription quality of service (QoS) level information corresponding to the terminal to the second communication network by the first communication network when the terminals is authenticated, and sending access rejected information to the second communication network by the first communication network when the terminal is unauthenticated;

providing services for the terminal by the second communication network according to the subscription QoS level information, or rejecting to provide any service for the terminal according to the access rejected information;

analyzing the access request when received by the resource sharing device, to obtain home operator information and terminal identification (ID) of the terminal according to the access request, and sending the home operator information, the terminal ID and the access request to the second communication network;

calculating costs of the terminal according to the home operator information and the terminal ID of the terminal by the second communication network when the second communication network provides services for the terminal to facilitate commercial settlement between operators, encrypting the home operator information, the terminal ID and the access request by the resource sharing device according to an encryption mode of a preset IP security channel, to obtain an encrypted data packet, and sending the encrypted data packet to the second communication network, wherein an outer IP address of the encrypted data packet is an IP address of a small cell gateway of the second communication network, and an inner address of the encrypted data packet is a target terminal address; and receiving the encrypted data packet and decrypting the encrypted data packet by the second communication network according to a decryption mode corresponding to the encryption mode of the preset IP security channel to obtain the home operator information, the terminal ID and the access request.

2. The resource sharing method according to claim 1, further comprising:

selecting the target backhaul link from a plurality of backhaul links corresponding to the second communication network by the resource sharing device according to a preset selecting principle, wherein the present selection principle comprises whether an operator of the second communication network signed an arrangement with the first communication network, and whether enough idle transmission resources exist in the backhaul link.

3. The resource sharing method according to claim 1, further comprising:

storing the home operator information, the terminal ID and the subscription QoS level information corresponding to the terminal by the second communication network and determining whether to provide services for the terminal when the access request of the terminal is received again, according to the stored home operator information, the terminal ID, and the subscription QoS level information.

4. The resource sharing method according to claim 3, further comprising:

updating the stored home operator information, the terminal ID and the subscription QoS level information corresponding to the terminal by the second communication network according to a preset time interval.

5. A resource sharing system, comprising:

a resource sharing device, a first communication network, and a second communication network, wherein:

the resource sharing device comprising at least one processor and a storage system that stores one or more programs which when executed by the at least one processor, causes the at least one processor to:

receive access request sent by a terminal from the first communication network, and send the access request to the second communication network through a target backhaul link of the second communication network;

the second communication network sends the received access request to the first communication network, for the first communication network to authenticate the terminal according to the access request;

the first communication network sends subscription quality of service (QoS) level information corresponding to the terminal to the second communication network when the terminal is authenticated, and sends access rejected information to the second communication network when the terminal is unauthenticated;

the second communication network further provides services for the terminal according to the subscription QoS level information, or rejects to provide any service for the terminal according to the access rejected information;

the one or more programs which when executed by the at least one processor, further causes the at least one processor to: analyze the access request when receiving the access request, to obtain home operator information and terminal identification (ID) of the terminal according to the access request, and to send the home operator information, the terminal ID and the access request to the second communication network;

the second communication network further calculates costs of the terminal according to the home operator information and the terminal ID when the second communication network provides services for the terminal;

the one or more programs when executed by the at least one processor, further causes the at least one processor to: encrypt the home operator information, the terminal ID, and the access request according to an encryption mode of a preset IP security channel, to obtain an encrypted data packet, and to send the encrypt data packet to the second communication network, wherein an outer IP address of the encrypted data packet is an IP address of a small cell gateway of the second communication network; and an inner address of the encrypted data packet is a target terminal address; and the second communication network is further configured to receive the encrypted data packet, and to decrypt the encrypted data packet according to a decryption mode corresponding to the encryption mode of the preset IP security channel, to obtain the home operator information, the terminal ID and the access request.

6. The resource sharing method according to claim 5, wherein:

the resource sharing device sends the encrypted data packet to the second communication network by using a differentiated service protocol or a resource reservation protocol.

7. The resource sharing method according to claim 5, wherein:
the one or more programs when executed by the at least one processor, further causes the at least one processor to: select the target backhaul link from a plurality of backhaul links corresponding to the second communication network according to a preset selection principle, wherein the preset selection principle comprises whether an operator of the second communication network signed an agreement with the first communication network, and whether enough idle transmission resources exist in the backhaul link.

8. The resource sharing method according to claim 5, wherein:
the second communication network further stores the home operator information, the terminal ID, and the subscription QoS level information corresponding to the terminal and to determine whether to provide services for the terminal when the access request of the terminal is received again, according to the stored home operator information, the terminal ID and the subscription QoS level information.

9. The resource sharing method according to claim 8, wherein:
the second communication network further updates the stored home operator information, the terminal ID, and the subscription QoS level information corresponding to the terminal according to a preset time interval.

10. The resource sharing method according to claim 5, wherein:
the resource sharing device is connected to the second communication network by a wired connection or a wireless connection.

* * * * *